Sept. 29, 1970 G. S. BURGESS 3,531,631

PARITY CHECKING SYSTEM

Filed Jan. 11, 1967

INVENTOR
GORDON S. BURGESS

BY Owen Lamb

AGENT

United States Patent Office 3,531,631
Patented Sept. 29, 1970

3,531,631
PARITY CHECKING SYSTEM

Gordon Stewart Burgess, Fareham Hants, England, assignor to International Business Machines Corporation, Armonk, N.Y., a corporation of New York Filed Jan. 11, 1967, Ser. No. 608,627
Int. Cl. G06f *11/10*
U.S. Cl. 235—153 13 Claims

ABSTRACT OF THE DISCLOSURE

Apparatus for checking a logic circuit which has no means built into the circuit for checking. Normally the circuit performs a function, such as adding operands, without checking. Test operands are applied to the circuit which should produce a result of known parity if the circuit operates correctly. A parity checker is connected to the output of the circuit. A parity check of the result produces an error indication if the logic circuit did not function properly.

BACKGROUND OF THE INVENTION

Field of the invention

The present invention relates to data processing and data transmission systems and more particularly to apparatus for checking such systems in which only portions of the data flow have provision for redundancy checking.

Description of the prior art

Many digital computing systems, data transmission systems and other similar systems which manipulate or transfer digital data are checked by using parity bits combined with the data. Usually a parity bit is a single one or zero combined with the data which consists of a plurality of ones and zeros so that the total number of ones is made even or odd. In some systems this form of checking is used to check the majority of the data flow. In other systems, however, parity bit generating and checking devices are only situated at selected points so that the data is only checked at portions of the system as a cost reduction measure. For example, the data may be checked only when it is extracted from storage. These systems have parity generators for generating the appropriate parity bit when data is applied to storage and a parity check circuit for checking the data when it is extracted from the storage.

SUMMARY OF THE INVENTION

It is an object of this invention to provide a checking system which checks a data transfer or manipulation path without passing a parity checking bit therethrough.

Briefly, the above object is accomplished by providing means for applying test data to the binary data transfer or manipulation circuit. If the circuit is operating correctly output data having a known parity results. A generator generates a fixed value parity bit which is combined with the output data. Finally the output data is parity checked and if the circuit has operated correctly the proper parity check result is obtained.

Figure 1:
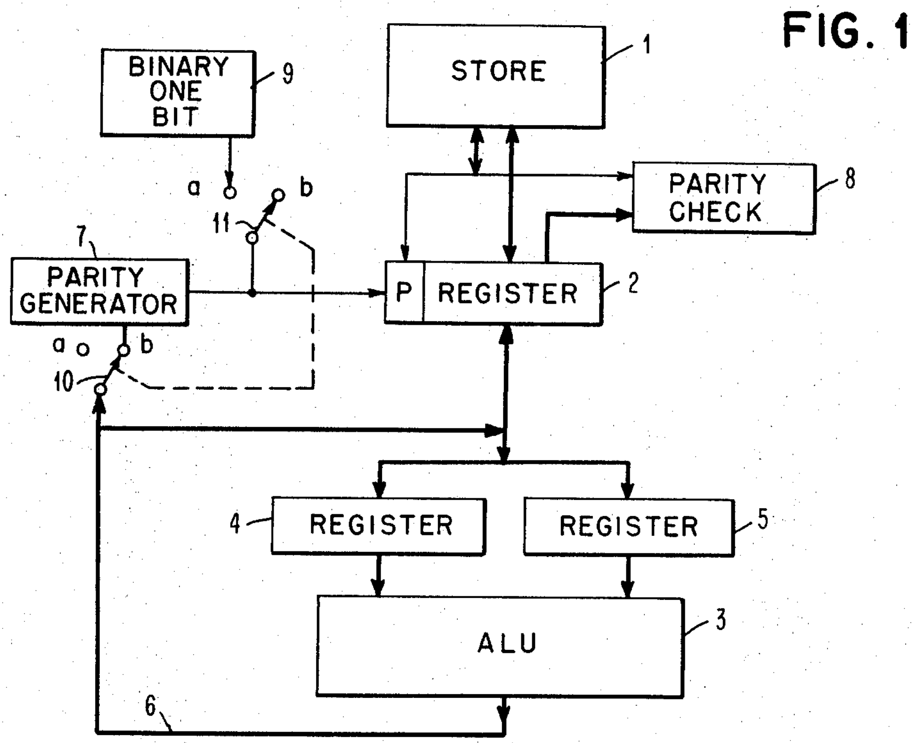
Figure 2:
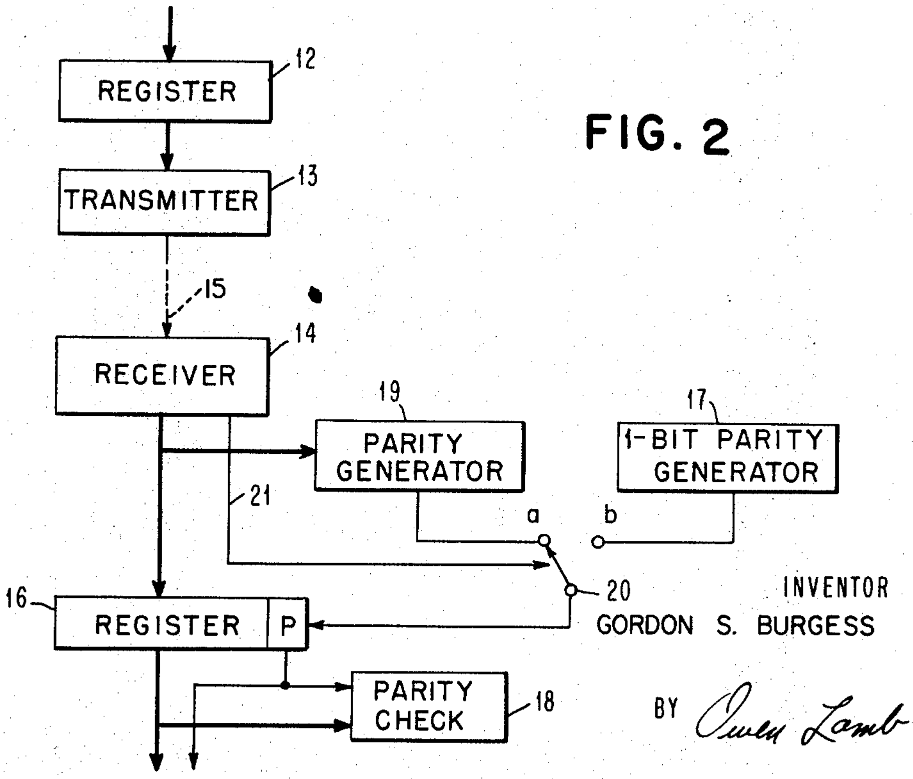

FIG. 1 is a block diagram of part of a digital computer incorporating a parity checking system in accordance with the invention and FIG. 2 is a block diagram of a data transmission incorporating a parity checking system in accordance with the invention.

DESCRIPTION OF THE PREFERRED EMBODIMENT

The digital computer system shown in FIG. 1 comprises a data store 1, a storage data register 2, an arithmetic and logical unit (ALU) 3, and two ALU input registers 4 and 5 through which data is transferred from register 2 to the ALU 3. Output signals from the ALU are transferred back to the store 1 through register 2 via output lines 6.

The system operates in a parallel-by-bit mode and each of the broad interconnecting lines shown in the diagram represents a number of leads equal to the byte size of the data. The narrow lines each indicate a single lead.

In the system shown, a parity bit is added to each byte of data as it is entered into the store, and the parity of data extracted from the store is checked. For the remainder of the system, however, no parity bit is included with the data bytes. The parity generation and checking circuits include a parity generator 7, a binary 1 bit generator 9, a single digit position P in register 2, and a parity check circuit 8. The parity generator 7 is connected to the ALU output leads 6 through a switch 10 and the bit generator 9 to the parity generator output lead through a switch 11. Switches 10 and 11 are ganged.

Under normal operating conditions, switches 10 and 11 are set to position *b*. Result bytes generated by the ALU are, therefore, applied through lines 6 to parity generator 7 and register 2. Assume for the purpose of explanation only, that the parity checking system operates on odd parity. If then, a result byte is of even parity, the generator 7 generates a binary 1 signal which is applied to digit position P of register 2. The whole word in register 2 (data byte plus parity bit) is then checked for odd parity and is then transferred to the store. Each word extracted from the store is passed to register 2, parity checked by parity check circuit 8 and then passed, without the parity bit to the arithmetic circuits.

If it is desired to test that part of the system including registers 4 and 5 and ALU 3, switches 10 and 11 are switched to position *a* and a diagnostic routine is initiated. For example, if it is wished to test this part of the circuit when the ALU is set to add, two known words, which, when added, will result in an even parity byte, are extracted from the store in succession. The first is parity checked and then applied to register 4, the second is parity checked and applied to register 5. They are then added in the ALU and the result applied to register 2 but not, due to the position of switch 10, to parity generator 7. Instead of a bit from generator 7, the P position of register 2 receives a binary 1 bit, through switch 11, from generator 9. The parity of the word in register 2 is then checked by check circuit 8. If some error had occurred during the passage of information through registers 4 and 5 and the ALU, this will be indicated in the parity check circuit 8, subject of course, to the limitation of parity check systems. Thus, the data is effectively parity checked throughout those portions of the system at which no parity check bit is present.

In the above described routine, the ALU was set to add, it is evident that, by selecting the proper known words from the store, the routine will be equally effective for any function performed by the ALU. Furthermore, again by selecting one or more particular words from the store, portions of a digital computer other than those shown in FIG. 1 can be tested in a similar manner.

Though the description is restricted to a parallel data flow system, the invention is equally applicable to serial systems.

FIG. 2 shows a data transmission system to which a parity checking system in accordance with the invention is applied. In this figure, thick interconnection lines indicate busses each of which carry data bytes and thin lines indicate single bit leads. Data bytes are applied from, for instance, a computer to a register 12 and from this register to a transmitter 13. This transmitter transmits this data in serial form to a receiver 14 via a transmission line 15. At the receiver the data is re-arranged into parallel-by-bit form and applied to a register 16. It should be noted that no parity bits have been used either at the transmitter or the receiver. Register 16 has a parity bit position P connected to receive parity bits from either a binary-1 bit generator 17 or a parity generator 19 through a switch 20. A parity check circuit 18 is connected to check complete words (data plus parity bits) in register 16.

For the purpose of explanation only, it will be assumed that the parity check circuit shows no error when the partity of the word in register 16 is odd. The transmission system transmits data in fixed number groups of words. At the end of each group, a particular even parity word is transmitted. This word may be received by register 12 or generated in the transmitter itself. At the end of a data group, a counter in the receiver emits a signal on line 21 indicating that a full group has been received. This signal is applied to switch 20 which is switched thereby to position *b* so that a binary 1 bit is applied from generator 17 to position P of register 16.

At the same time, the particular even parity word is applied from the receiver to register 16. If this word has been unchanged during transmission, register 16 contains an odd parity word and "no error" is signalled by check circuit 18. If however, there has been some fault in the transmission of the word, the check circuit indicates an error. Again, this is subject to the limitations of parity checking.

Upon the occurrence of an error signal, an error indication may be transmitted by a transmitter (not shown) associated with receiver 14, received by a receiver (not shown) associated with transmitter 13, and the aforementioned particular even parity word is retransmitted. If then the parity check circuit again signals "no error," the group of data bytes is retransmitted.

During transmission of the data groups, no signal is present on line 21 and switch 20 returns to position *a*. An output from parity generator 19 is, therefore, applied to the P position of register 16. The value of parity bits from generator 19 is dependent upon the parity of data words applied from the output of receiver 14, so that output words of correct parity are obtained from register 16.

Thus, parity error checks are made between the transmission of groups of data bytes thus providing a measure of checking without the necessity of transmitting parity bits with each data word. Though, in this embodiment, parity checks were made on parallel data words, it is evident that such checks could be performed when a serially operating system is used.

In both FIGS. 1 and 2, the switches are shown as mechanical switches, for instances relays. However, they could equally well be electronic switches utilizing transisters. In the embodiment described with reference to FIG. 1, switches 10 and 11 would normally be operated by control signals developed by the computer control system when the diagnostic routine is initiated.

The two embodiments shown describe the invention in a simple environment, using a simple redundancy checking code, utilizing a parity bit. It should be understood, however, that the invention may be practiced by using more complex and powerful codes, such as, but not limited to fixed weight codes, residue codes, cyclic codes, etc.

While the invention has been particularly shown and described with reference to the preferred embodiments thereof, it will be understood by those skilled in the art that various changes in form and details may be made therein without departing from the spirit and scope of the invention.

What is claimed is:

1. A parity checking system comprising:
means for applying predetermined test data to the input of a binary data manipulation circuit which provides at an output, when the circuit is operating correctly, output data of predetermined parity,
a generator external to said data manipulation circuit for generating a fixed value parity bit at an output of said generator,
means connected to said output of said data manipulation circuit and said output of said generator for combining the parity bit with the output data,
and a parity check circuit connected to said combining means for checking the combined data.

2. A system according to claim 1 in which the data manipulation circuit includes an arithmetic and logical unit and said test data comprises two data words which, when applied to the arithmetic and logical unit, when it is controlled to perform a particular function, result in an output word of predetermined parity.

3. A system according to claim 1 including:
a variable parity bit generator connectable to the output of said data manipulation circuit and arranged to generate a parity bit having a value determined by the parity of output data from said data manipulation circuit and to apply said parity bit to said combining means,
and switching means for isolating either the fixed value parity bit generator from said combining means or the variable parity bit generator from said data manipulation circuit, the arrangement being such that when said test data is applied to said data manipulation circuit, the variable parity bit generator is isolated from said data manipulation circuit, and when other data is applied thereto, the fixed value parity bit generator is isolated from said combining means.

4. A system according to claim 1 in which said data manipulation circuit includes a data transmission system arranged to transmit groups of information words, the groups being interspersed with single test words of predetermined parity, each of said test words, at the output of the transmission system, being combined with said fixed value parity bit.

5. A system according to claim 4 including:
a variable parity bit generator connected to the output of said data manipulation circuit and arranged to generate a parity bit having a value determined by the parity of each output word from said data manipulation circuit and to apply said parity bit to said combining means,
and switching means for isolating the output of either the fixed value parity bit generator or the variable parity bit generator from said combining means, whereby when a test word is applied to said data manipulation circuit the variable parity bit generator may be isolated therefrom, and when an information word is applied thereto, the fixed value parity bit generator may be isolated therefrom.

6. A system according to claim 2 including:
a variable parity bit generator connected to said data manipulation circuit and arranged to generate a parity bit having a value determined by the parity of output data from said data manipulation circuit and to apply said parity bit to the combining means,
and switching means for isolating either the fixed value parity bit generator or the variable parity bit generator from the circuit, the arrangement being such that when said test data is applied to said data manipulation circuit, the variable parity bit generator is isolated therefrom, and when other data is applied thereto, the fixed value parity bit generator is isolated therefrom.

7. A checking system comprising:
means for applying predetermined test data to a binary data manipulation circuit which provides, when the circuit is operating correctly, output data of a predetermined configuration, a generator external to said data manipulation circuit for generating error detection/correction bits,
means for combining the error detection/correction bits with the output data, and a check circuit connected to check the combined data.

8. A system according to claim 7 in which the data manipulation circuit includes an arithmetic and logical unit and said test data comprises two data words which, when applied to the arithmetic and logical unit, when it is controlled to perform a particular function, result in an output word of a predetermined configuration.

9. A system according to claim 3 in which said data manipulation circuit includes a data transmission system arranged to transmit groups of information words, the groups being interspersed with single test words of predetermined parity, each of said test words, at the output of the transmission system, being combined with said fixed value parity bit.

10. A parity checking system comprising:

means for applying predetermind test data to the input of a binary data manipulation circuit which provides at an output, when the circuit is operating correctly, output data of predetermined parity, a generator external to said data manipulation circuit for generating a fixed value parity bit at an output of said generator, means connected to said output of said data manipulation circuit and said output of said generator for combining the parity bit with the output data, a variable parity bit generator connected to the output of said data manipulation circuit and arranged to generate a parity bit having a value determined by the parity of each output word from the said data manipulation circuit and to apply said parity bit to said combining means, a parity check circuit connected to said combining means for checking the combined data, and switching means for isolating the output of either the fixed value parity bit generator or the variable parity bit generator from said combining means, whereby when a test word is applied to said data manipulation circuit the variable parity bit generator is isolated therefrom, and when an information word is applied thereto, the fixed value parity bit generator is isolated therefrom.

11. A system according to claim 10 in which said data manipulation circuit includes a data transmission system arranged to transmit groups of information words, the groups being interspersed with single test words of predetermined parity, each of said test words, at the output of the transmission system, being combined with said fixed value parity bit.

12. A parity checking system comprising:

means for applying predetermined test data to the input of a binary data manipulation circuit which provides at an output, when the circuit is operating correctly, output data of predetermined parity, a generator external to said data manipulation circuit for generating a fixed value parity bit at an output of said generator, means connected to said output of said data manipulation circuit and said output of said generator for combining the parity bit with the output data, a variable parity bit generator connected to said data manipulation circuit and arranged to generate a parity bit having a value determined by the parity of output data from said data manipulation circuit and to apply said parity bit to the combining means, a parity check circuit connected to said combining means for checking the combined data, and switching means for isolating either the fixed value parity bit generator or the variable parity bit generator from the circuit, the arrangement being such that when said test data is applied to said data manipulation circuit, the variable parity bit generator is isolated therefrom, and when other data is applied thereto, the fixed value parity bit generator is isolated therefrom.

13. A system according to claim 12 in which the data manipulation circuit includes an arithmetic and logical unit and said test data comprises two data words which, when applied to the arithmetic and logical unit, when it is controlled to perform a particular function, result in an output word of predetermined parity.

References Cited

UNITED STATES PATENTS

| | | | |
|---|---|---|---|
| 3,063,636 | 11/1962 | Sierra | 235—153 |
| 3,156,767 | 11/1964 | Van Duuren et al. | 340—146.1 X |
| 3,196,260 | 7/1965 | Pugmire | 235—153 X |
| 3,287,546 | 11/1966 | Geller | 235—153 |
| 3,342,983 | 9/1967 | Pitkowsky et al. | 235—153 |

EUGENE G. BOTZ, Primary Examiner

C. E. ATKINSON, Assistant Examiner

U.S. Cl. X.R.

340—146.1